US009225865B2

(12) United States Patent
Matsui

(10) Patent No.: US 9,225,865 B2
(45) Date of Patent: Dec. 29, 2015

(54) IMAGE READER AND IMAGE PROCESSING APPARATUS

(71) Applicant: KYOCERA Document Solutions Inc., Osaka-shi, Osaka (JP)

(72) Inventor: Shinya Matsui, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/664,942

(22) Filed: Mar. 23, 2015

(65) Prior Publication Data

US 2015/0281502 A1    Oct. 1, 2015

(30) Foreign Application Priority Data

Mar. 27, 2014  (JP) .................................. 2014-065496

(51) Int. Cl.
*H04N 1/46* (2006.01)
*H04N 1/00* (2006.01)
*H04N 1/024* (2006.01)
*H04N 1/028* (2006.01)

(52) U.S. Cl.
CPC ....... *H04N 1/00997* (2013.01); *H04N 1/02481* (2013.01); *H04N 1/02815* (2013.01)

(58) Field of Classification Search
None
See application file for complete search history.

(56) References Cited

U.S. PATENT DOCUMENTS

| 5,875,269 | A  | * | 2/1999  | Yamashita | ............. | H04N 1/028 358/474 |
| 6,316,767 | B1 | * | 11/2001 | Paxton    | ..................... | H04N 1/00 250/214 AL |
| 7,453,055 | B2 | * | 11/2008 | Susaki    | .................. | H04N 1/401 250/208.1 |
| 7,692,822 | B2 | * | 4/2010  | Tanaka    | ............... | H04N 1/02815 358/471 |
| 9,013,759 | B2 | * | 4/2015  | Ishida    | ................ | H04N 1/00689 351/206 |

(Continued)

FOREIGN PATENT DOCUMENTS

| JP | H08149299 A | 6/1996 |
| JP | 2001005119 A | 1/2001 |
| JP | 2013207469 A | 10/2013 |

*Primary Examiner* — Madelein Nguyen

(57) ABSTRACT

An image reader includes a platen, a carriage, a light shielding unit, a positioning mark, an ambient light detecting unit, and a control unit. The positioning mark is arranged in an area in which the light shielding unit is disposed or in an area adjacent in a main scanning direction to the area in which the light shielding unit is disposed, at a position falling within the range that can be read by the carriage. When the ambient light detecting unit detects the presence of ambient light, the control unit causes the carriage to move with the exposure lamp turned off to detect a position of the positioning mark. When the ambient light detecting unit detects the absence of ambient light, the control unit causes the carriage to move with the exposure lamp turned on to detect the position of the positioning mark.

10 Claims, 9 Drawing Sheets

(56) References Cited

U.S. PATENT DOCUMENTS

| | | | |
|---|---|---|---|
| 2005/0052680 A1* | 3/2005 | Okamura | H04N 1/00551 358/1.14 |
| 2009/0051497 A1* | 2/2009 | Miyaso | B41J 3/50 340/10.4 |
| 2009/0080031 A1* | 3/2009 | Ishido | H04N 1/00551 358/449 |
| 2010/0053702 A1* | 3/2010 | Nagasaka | H04N 1/4076 358/475 |
| 2010/0103479 A1* | 4/2010 | Seo | H04N 1/00519 358/474 |
| 2010/0165423 A1* | 7/2010 | Okuzono | H04N 1/00835 358/488 |
| 2010/0231991 A1* | 9/2010 | Nakajima | H04N 1/00835 358/475 |
| 2010/0328735 A1* | 12/2010 | Matsui | H04N 1/00002 358/488 |
| 2012/0026559 A1* | 2/2012 | Katsuda | G03G 15/607 358/475 |
| 2013/0044357 A1* | 2/2013 | Igawa | H04N 1/0071 358/474 |
| 2014/0078532 A1* | 3/2014 | Nikaku | G03G 15/00 358/1.13 |
| 2014/0293370 A1* | 10/2014 | Loi | H04N 1/00758 358/475 |
| 2015/0002911 A1* | 1/2015 | Matsui | H04N 1/00005 358/453 |
| 2015/0092253 A1* | 4/2015 | Kasahara | H04N 1/02885 358/475 |

* cited by examiner

IMAGE READER AND IMAGE PROCESSING APPARATUS

INCORPORATION BY REFERENCE

The disclosure of Japanese Patent Application No. 2014-65496 filed on Mar. 27, 2014 including the specification, drawings and abstract is incorporated herein by reference in its entirety.

BACKGROUND

The present disclosure relates to image readers and image processing apparatuses, and more particularly to an image reader which reads an image of a document and an image processing apparatus which includes such an image reader.

Image processing apparatuses, typified by digital multi-functional peripherals and the like, include an image reader which reads an image of a document. The image reader reads images of a plurality of sheets of documents set on an auto document feeder (ADF), or reads an image of a document placed on a platen. On the basis of the image read by the image reader, the image processing apparatus performs image processing or forms an image in an image forming unit.

The image reader uses a reading unit called a carriage, equipped with an image sensor, to read an image of a document. The carriage is disposed in a space under the platen, and is movable in a so-called sub-scanning direction. The carriage irradiates a document with light emitted from an exposure lamp, and reads an image of the document by using the image sensor. In the case of reading images of documents set in the ADF, the carriage stops at a reading position at which it reads an image of a document while the document is passing (hereinafter, this position will be simply referred to as "reading position") in the sub-scanning direction. The ADF feeds documents sequentially to the reading position such that one document passes through the position at a time. The carriage reads images of the plurality of sheets of documents while they are passing through the position, by using the image sensor included in the carriage. On the other hand, in the case of reading an image of a document placed on the platen, the carriage, while moving in the sub-scanning direction, irradiates the document placed on the platen with light from the exposure lamp and collects the reflected light to thereby read the image of the document by using the image sensor.

For such a carriage configured to move or stay in a prescribed position while reading an image as described above, a home position (hereinafter, also simply referred to as "HP") is set which becomes a reference position of the carriage. For example, when a sleep mode as an energy-saving mode is cleared in an image reader, the carriage is moved to the HP, as an initialization operation of the image reader. Thereafter, with the HP as the reference position, the carriage is moved to the reading position for reading images of the documents fed by the ADF, or to the position where it starts reading an image of the document placed on the platen. This configuration enables the carriage to start reading from an appropriate position, irrespective of where the carriage was stopped after the previous image reading operation, thereby ensuring an appropriate image reading operation.

A technique related to such an image reader having a HP set therein is conventionally known. In the conventional image reader, it is configured such that the carriage is placed in the home position at the time of reading an image of a document. The carriage, placed in the home position, is then caused to move to a position where shading correction is carried out or to a position where an image of a document is read. The carriage is equipped with a light shield plate, and a photo interrupter (PI) sensor is provided in the main body. In order to confirm the position of the carriage, first, the position of the carriage at the time when the light shield plate has blocked the light directed to the PI sensor is detected. Then, on the basis of the detected position, the carriage is moved to the home position. With this configuration, however, a relatively expensive PI sensor is indispensable, leading to a complicated mechanism and increased cost.

There is also conventionally known an image reader which is configured, in order to reliably guide a carriage to a prescribed home position in an initialization operation, to detect a positioning mark at the time of initialization and drive a carriage-holding unit by a driving unit to guide the carriage-holding unit to the home position. In this conventional technique, instead of providing a PI sensor, an image sensor, originally for reading an image, is used to detect the positioning mark to thereby recognize the position of the carriage. With such an image reader, however, light from the exposure lamp may get into a user's eyes, making the user feel uncomfortable with the glare.

SUMMARY

In an aspect of the present disclosure, an image reader includes a platen, a carriage, a light shielding unit, a positioning mark, an ambient light detecting unit, and a control unit. The platen places thereon a document whose image is to be read. The carriage is movable in a sub-scanning direction, and includes an exposure lamp configured to irradiate the document with light, and an image sensor configured to read the image of the document on the basis of light reflected from the document. The light shielding unit is arranged adjacent in the sub-scanning direction to the platen and blocks the light from the exposure lamp from leaking out. The positioning mark is arranged in an area in which the light shielding unit is disposed or in an area adjacent in a main scanning direction to the area in which the light shielding unit is disposed, at a position falling within a range that can be read by the carriage. The positioning mark defines a position associated with a home position of the carriage. The ambient light detecting unit detects presence or absence of ambient light incident onto the carriage from above the carriage. When the ambient light detecting unit detects the presence of ambient light, the control unit causes the carriage to move with the exposure lamp turned off to detect a position of the positioning mark. When the ambient light detecting unit detects the absence of ambient light, the control unit causes the carriage to move with the exposure lamp turned on to detect the position of the positioning mark.

In another aspect of the present disclosure, an image processing apparatus includes an image reader which reads an image. The image reader includes a platen, a carriage, a light shielding unit, a positioning mark, an ambient light detecting unit, and a control unit. The platen places thereon a document whose image is to be read. The carriage is movable in a sub-scanning direction, and includes an exposure lamp configured to irradiate the document with light, and an image sensor configured to read the image of the document on the basis of light reflected from the document. The light shielding unit is arranged adjacent in the sub-scanning direction to the platen and blocks the light from the exposure lamp from leaking out. The positioning mark is arranged in an area in which the light shielding unit is disposed or in an area adjacent in a main scanning direction to the area in which the light shielding unit is disposed, at a position falling within a range that can be read by the carriage. The positioning mark defines a position associated with a home position of the carriage. The ambient light detecting unit detects presence or absence of ambient light incident onto the carriage from above the carriage. When the ambient light detecting unit detects the presence of ambient light, the control unit causes the carriage to move with the exposure lamp turned off to detect a position of the positioning mark. When the ambient light detecting unit detects the absence of ambient light, the control unit causes the carriage to move with the exposure lamp turned on to detect the position of the positioning mark.

DETAILED DESCRIPTION

Figure 1:
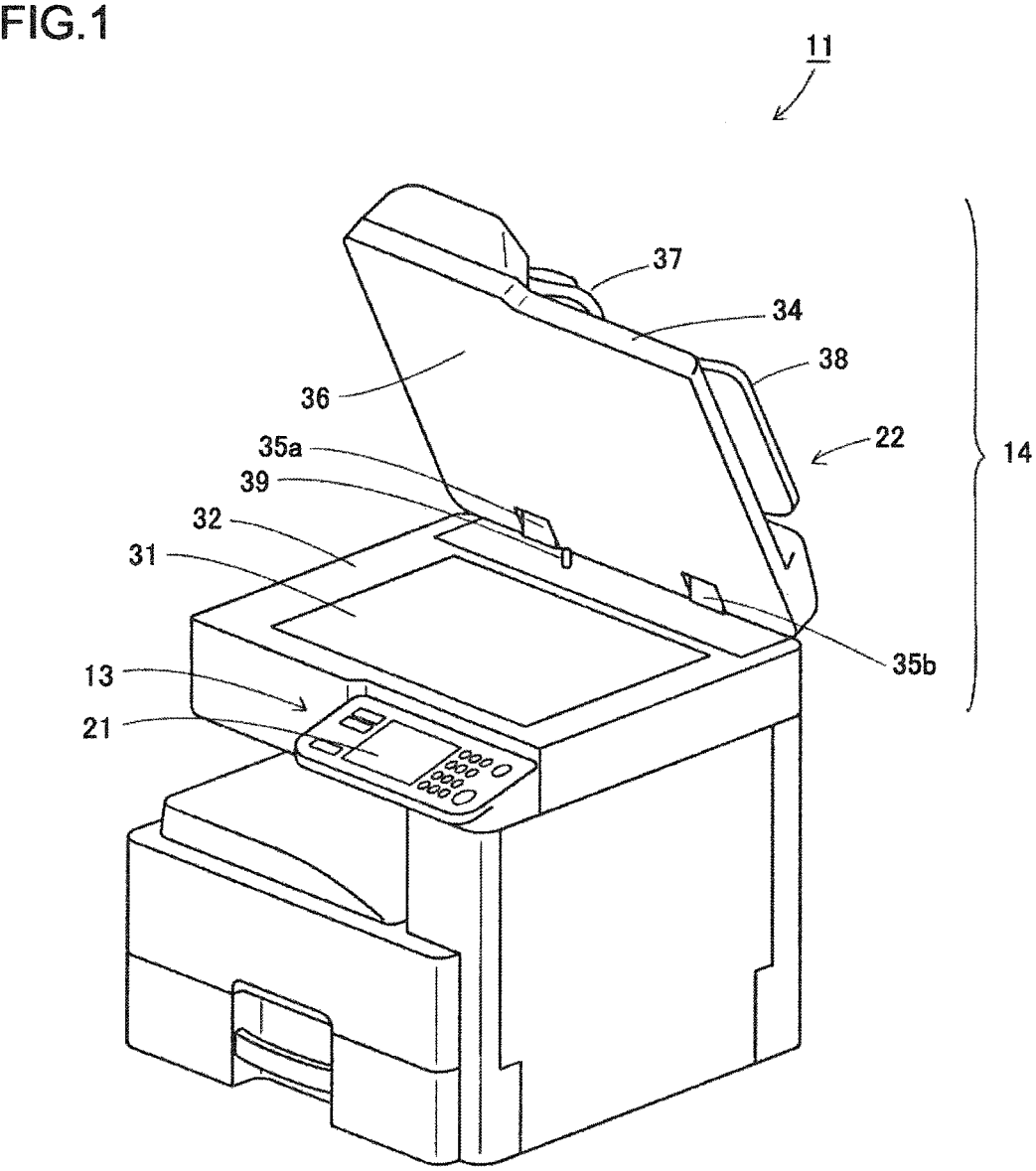
FIGS. 1 and 2 are schematic perspective views of a digital multifunctional peripheral in the case where an image processing apparatus according to an embodiment of the present disclosure is applied to the digital multifunctional peripheral, FIG. 1 illustrating the state where a document pressure plate is open, FIG. 2 illustrating the state where the document pressure plate is closed.
Figure 2:
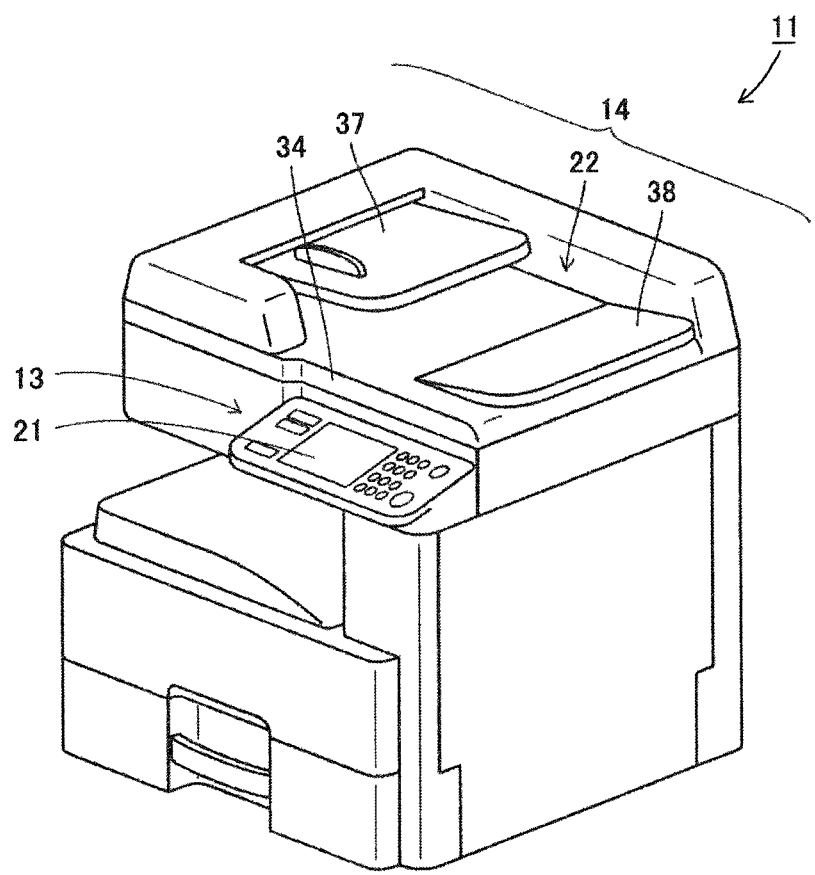
Figure 3:
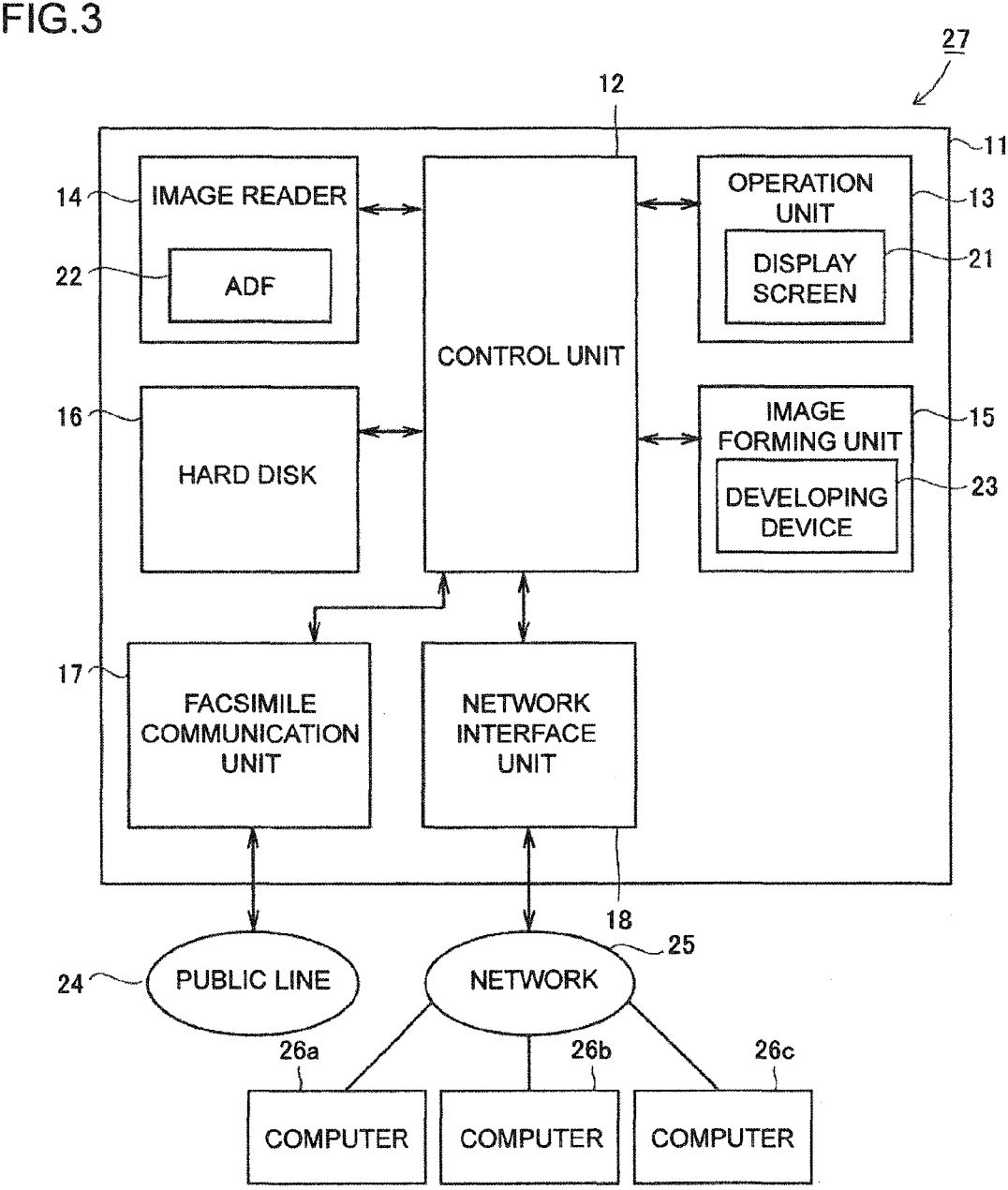
FIG. 3 is a block diagram showing the configuration of the digital multifunctional peripheral in the case where the image processing apparatus according to an embodiment of the present disclosure is applied to the digital multifunctional peripheral.

Embodiments of the present disclosure will be described below. First, the configuration of an image processing apparatus according to an embodiment of the present disclosure will be described. FIGS. 1 and 2 are schematic perspective views of a digital multifunctional peripheral in the case where the image processing apparatus according to an embodiment of the present disclosure is applied to the digital multifunctional peripheral. FIG. 1 illustrates the state where a document pressure plate (described later) is open. FIG. 2 illustrates the state where the document pressure plate is closed. In the states shown in FIGS. 1 and 2, the front side of the digital multifunctional peripheral corresponds to the side on which an operation unit (described later) is arranged, and the rear side of the digital multifunctional peripheral corresponds to the opposite side, i.e. the side on which the document pressure plate is joined to the main body of the apparatus. FIG. 3 is a block diagram showing the configuration of the digital multifunctional peripheral in the case where the image processing apparatus according to an embodiment of the present disclosure is applied to the digital multifunctional peripheral.

Referring to FIGS. 1 to 3, the digital multifunctional peripheral 11 as the image processing apparatus according to an embodiment of the present disclosure includes: a control unit 12; an operation unit 13 which includes a display screen 21 for displaying information originated from the digital multifunctional peripheral 11 side and content input by a user; an image reader 14; an image forming unit 15 which includes a developing device 23; a hard disk 16; a facsimile communication unit 17 which is connected to a public line 24 and performs facsimile transmission and reception; and a network interface unit 18 for connecting with a network 25. The control unit 12 is responsible for overall control of the digital multifunctional peripheral 11. The image reader 14 includes an auto document feeder (ADF) 22 which automatically feeds a document that has been set, to a reading section. The image reader 14 reads an image of a document. The image forming unit 15 forms an image on the basis of the read image or image data transmitted via the network 25. It should be noted that the arrows shown in FIG. 3 indicate flows of control signals as well as data related to control and images. The image reader 14 is also controlled by the control unit 12 included in the digital multifunctional peripheral 11.

The digital multifunctional peripheral 11 has a plurality of functions related to image processing, such as a copying function, a printing function, a facsimile function, etc. The digital multifunctional peripheral 11 also has a function enabling detailed settings for the respective functions.

Further, for example, an image processing system 27 including the digital multifunctional peripheral 11 includes a plurality of computers 26a, 26b, and 26c in addition to the digital multifunctional peripheral 11.

Figure 4:
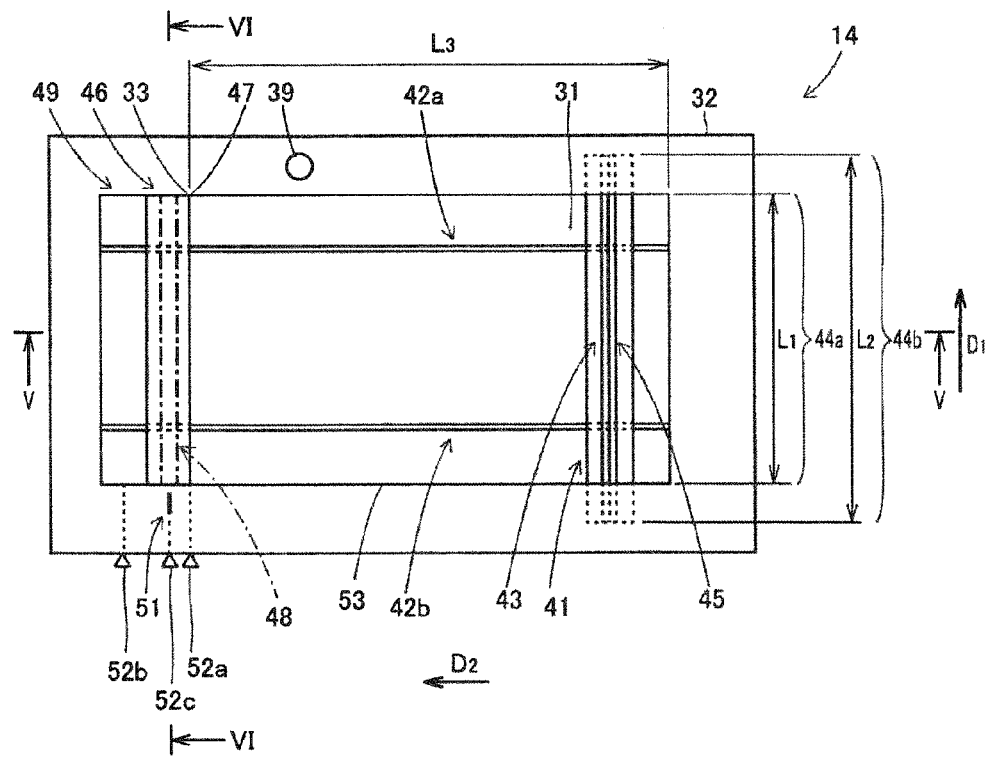
FIG. 4 is a schematic view, as seen from above, of a part of an image reader according to an embodiment of the present disclosure.
Figure 5:
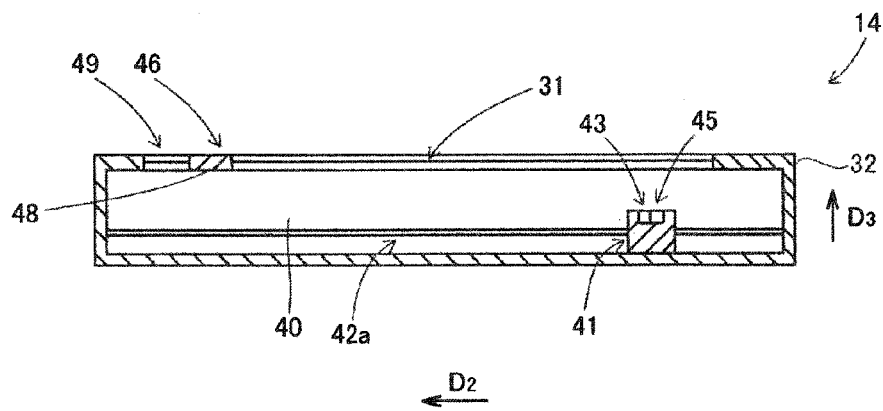
FIG. 5 is a schematic cross-sectional view of a part of the image reader, taken along the plane indicated by V-V in FIG. 4.
Figure 6:
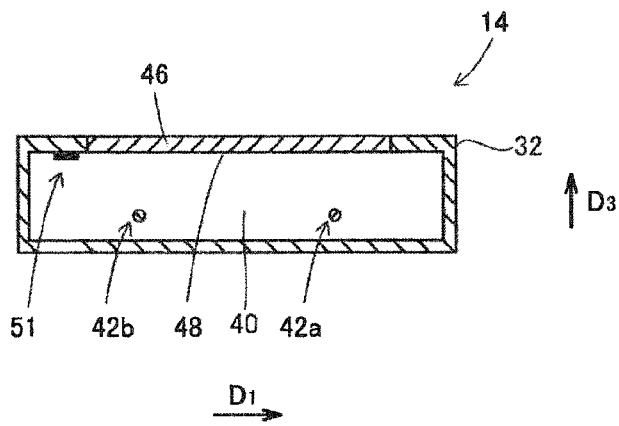
FIG. 6 is a schematic cross-sectional view of a part of the image reader, taken along the plane indicated by VI-VI in FIG. 4.
Figure 7:
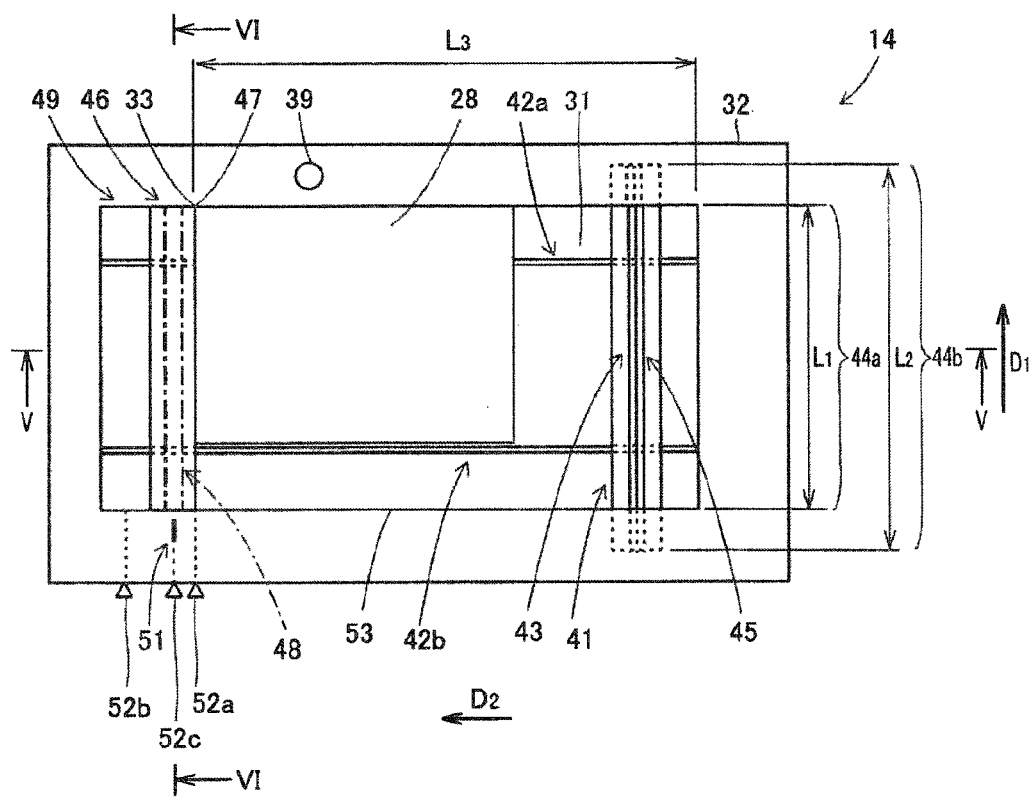
FIG. 7 is a schematic view, as seen from above, of a part of the image reader, with a document placed on a platen.

A description will now be made about the detailed configuration of the image reader 14 included in the digital multifunctional peripheral 11 according to an embodiment of the present disclosure. FIG. 4 is a schematic view, as seen from above, of a part of the image reader 14. FIGS. 5 and 6 are schematic cross-sectional views of parts of the image reader 14. FIG. 5 is a cross-sectional view taken along the plane indicated by V-V in FIG. 4, the plane passing through the center in the main scanning direction of the image reader 14 and extending in the sub-scanning direction. FIG. 6 is a cross-sectional view taken along the plane indicated by VI-VI in FIG. 4, the plane including a positioning mark (described later) and extending in the main scanning direction. FIG. 7 shows the state where a document is placed on a platen in the case shown in FIG. 4. In FIGS. 4 to 7, the ADF 22 and hinges (described later), among others, are not illustrated, for facilitating understanding. The direction indicated by an arrow $D_1$ in FIGS. 4, 6, and 7 or its opposite direction corresponds to the main scanning direction. The arrow $D_1$ indicates the direction from the front side to the rear side of the apparatus. The direction indicated by an arrow $D_2$ in FIGS. 4, 5, and 7 or its opposite direction corresponds to the sub-scanning direction.

The direction indicated by an arrow $D_3$ in FIGS. 5 and 6 corresponds to an up direction. That is, FIGS. 4 and 7 show the image reader 14 as seen from above. In FIGS. 4 and 7, for facilitating understanding, the position to start reading an image of a document placed on the platen, the position to read an image of a document fed by the ADF, and the home position as a reference position where the carriage is placed in the initialization operation of the image reader are each indicated by an outlined triangle mark. In the embodiment shown in FIG. 7, a rectangular document 28 is placed on the platen 31 such that the sub-scanning direction corresponds to the longitudinal direction of the document. In this case, the document is placed in such a manner that the front side of the platen 31 is exposed over the entire area in the sub-scanning direction. In other words, in any position in the sub-scanning direction of the platen 31, there is an area uncovered by the document 28 in the main scanning direction of the platen 31.

Referring to FIGS. 1 to 7, the image reader 14 includes the platen 31 for placing thereon a document 28 whose image is to be read. The platen 31 can transmit light emitted from beneath the platen 31, from within a space 40 provided in the apparatus casing, so that the document 28 placed on the platen 31 is irradiated with the light. The image reader 14 can read a document 28 placed on the platen 31 within the range corresponding to a length $L_3$ in the sub-scanning direction of the platen 31. Although not shown in the figure, the platen 31 has an alignment mark provided at the upper-left corner 33 of the platen 31 as seen from above as in FIG. 7, or more specifically, at the corner 33 on the rear side of the platen 31 and on the side on which a light shielding unit (described later) is arranged, for instructing a user to align a corner of a document 28 with the alignment mark when placing the document 28 on the platen 31.

The image reader 14 includes a document pressure plate 34 configured to hold a document 28 placed on the platen 31 in place. The document pressure plate 34 can be opened or closed to uncover or cover the upper surface of the platen 31. As explained above, FIG. 1 shows the state where the document pressure plate 34 is open, and FIG. 2 shows the state where the document pressure plate 34 is closed. The document pressure plate 34 is joined to a casing 32 with a pair of hinges 35a, 35b. A rear surface 36 of the document pressure plate 34, facing the platen 31 when the document pressure plate 34 is closed, is made of a white-colored flat member. It should be noted that the document pressure plate 34 constitutes a part of the configuration of the ADF 22. Briefly stated, the ADF 22 includes: the document pressure plate 34 which faces the platen 31 in the closed state; a document placement tray 37 for setting a plurality of sheets of documents 28 thereon; a plurality of rollers (not shown) including a pickup roller for transporting the documents 28; and a document discharge tray 38 onto which the documents 28 the images of which have been read are discharged. In the ADF 22, a plurality of sheets of documents 28 are set in the document placement tray 37 disposed above the document pressure plate 34 in the state where the document pressure plate 34 is closed. When the ADF 22 detects depression of a start button included in the operation unit 13, the ADF 22 feeds the set sheets of documents 28 sequentially to the platen 31 side. When the images of the documents 28 have been sequentially read by a carriage (described later), the ADF 22 discharges the documents 28 onto the document discharge tray 38. The ADF 22 is used effectively when there is more than one sheet of document to be read.

The image reader 14 includes a document pressure plate position detecting unit that detects whether the document pressure plate 34 is open or closed. In the present embodiment, the document pressure plate position detecting unit includes a projection member 39 which is disposed on the rear side of the platen 31 in a region of the casing 32 where no document 28 is placed. The projection member 39 is configured to protrude upward to a certain extent from the surface level of the platen 31, as it is urged upward by a spring (not shown) or the like. When the document pressure plate 34 is closed, a part on the rear side of the document pressure plate 34 abuts against the tip end of the projection member 39, so that the projection member 39 is pressed down into the casing 32. When the pressed-down state of the projection member 39 is detected by a sensor (not shown) or the like, it is detected that the document pressure plate 34 is closed; otherwise, it is detected that the document pressure plate 34 is open. Here, the control unit 12 and the projection member 39 operate as the document pressure plate status detecting unit.

The image reader 14 includes a carriage 41 which is disposed in the space 40 under the platen 31 and is movable along the platen 31. In this case, the carriage 41 is movable, in the space 40 under the platen 31, in the sub-scanning direction which is the direction indicated by the arrow $D_2$ or the opposite direction. More specifically, the carriage 41 is configured to be movable in the sub-scanning direction within the range where the platen 31, a light shielding unit (described later), and an ADF-fed document reading unit (described later) are arranged. In the case of reading an image of a document 28 placed on the platen 31, the carriage 41 reads the image of the document 28 while moving in the direction opposite to the direction indicated by the arrow $D_2$ from the start position where it starts reading. When the carriage 41 has finished reading the image of the document 28, the carriage 41 moves in the direction indicated by the arrow $D_2$ to return to the position where it started reading the document 28. In the space 40 under the platen 31, two guide rails 42a and 42b are arranged in parallel with and spaced apart from each other, to extend in the sub-scanning direction in that space. The carriage 41 moves as it is guided by these two guide rails 42a and 42b.

The carriage 41 includes an exposure lamp 43, which emits light upward from within the space 40 under the platen 31, a plurality of mirrors (not shown), a lens (not shown) which collects light, and a charge coupled device (CCD) sensor (not shown) serving as an image sensor. The exposure lamp 43 is configured with a plurality of light emitting diodes (LEDs) arranged over the entire area in the main scanning direction. When reading an image of a document 28, the carriage 41 emits light from the exposure lamp 43 toward the platen 31 side, while moving in the sub-scanning direction. The carriage 41 uses the mirrors and the lens to collect the light reflected from the platen 31 side, or more specifically from the document 28 placed on the platen 31, and cause the collected light to enter the CCD sensor, to thereby read the image of the document 28 placed on the platen 31.

The image of the document 28 placed on the platen 31 is read while the carriage 41 is moved in the sub-scanning direction within the range beneath the platen 31. The specific position in the sub-scanning direction at which the operation of reading the document 28 placed on the platen 31 is started is shown as a position 52a in FIG. 4. The position 52a corresponds to an end in the sub-scanning direction of the platen 31 on the side where the light shielding unit (described later) is arranged.

The carriage 41 has a length $L_2$ in the main scanning direction which is longer than the length $L_1$ in the main scanning direction of the platen 31. Within the area in the sub-scanning direction in which the platen 31 is located, the carriage 41 can irradiate, with light, the back surface of the casing 32 on the front side and on the rear side outside the platen 31, to read an image of the back surface of the casing 32. The range in the main scanning direction in which the carriage 41 is able to read a document 28 placed on the platen 31 is shown as an area 44a in FIGS. 4 and 7. The range in the main scanning direction in which the carriage 41 is able to read any image is shown as an area 44b in FIGS. 4 and 7. Needless to say, on the front and rear sides outside the platen 31, only parts of the back surface of the casing 32 are read. In the case where the carriage 41 reads an image of a document 28, the carriage 41 recognizes only the image obtained within the area 44a in the main scanning direction in which the platen 31 is located, as the image of the document 28.

The carriage 41 also includes an ambient light detecting unit 45 which detects the presence or absence of ambient light incident onto the carriage 41 from above the carriage 41. The ambient light detecting unit 45 is attached to the carriage 41. Specifically, the ambient light detecting unit 45 is disposed adjacent to the exposure lamp 43 in the sub-scanning direction, to extend in parallel with the exposure lamp 43. The ambient light detecting unit 45 is arranged on the side opposite to the side indicated by the arrow $D_2$ of the exposure lamp 43 in the sub-scanning direction. The ambient light detecting unit 45 is also arranged over the entire area in the main scanning direction of the carriage 41. The ambient light detecting unit 45 detects the presence or absence of ambient light incident into the interior of the casing 32 from the platen 31 side, or, into the space 40 where the carriage 41 is located, or, light incident from the outside of the digital multifunctional peripheral 11. In the state where the document pressure plate 34 is closed, no ambient light enters. Therefore, in the state where the document pressure plate 34 is closed, the ambient light detecting unit 45 constantly detects the absence of ambient light. In the state where the document pressure plate 34 is open, ambient light enters when the platen 31 is not covered by a document placed on the platen 31. Therefore, in the state where the document pressure plate 34 is open, when the document placed on the platen 31 is not completely covering the platen 31 in the main scanning direction, the ambient light detecting unit 45 detects the presence of ambient light. Even in the state where the document pressure plate 34 is open, if the document is placed on the platen 31 so as to cover the entire area in the main scanning direction of the platen 31, then no ambient light enters, and the ambient light detecting unit 45 detects the absence of ambient light.

The image reader 14 includes a light shielding unit 46 which is arranged adjacent to the platen 31 in the sub-scanning direction and serves to block the light from the exposure lamp 43. When seen from above as in FIGS. 4 and 7, the platen 31 and the light shielding unit 46 are arranged adjacent to each other in the sub-scanning direction such that a rear-side corner 47 of the light shielding unit 46 at its end in the direction opposite to the direction indicated by the arrow $D_2$ matches the rear-side corner 33 of the platen 31 at its end in the direction indicated by the arrow $D_2$. The light shielding unit 46 is made up of a white-colored resin member, which is of an elongated plate shape that extends in the main scanning direction. The light shielding unit 46 may be integral with the casing 32.

On a part of a surface of the light shielding unit 46 facing the space 40 in which the carriage 41 is located, a white reference surface 48 is provided, which serves as a reference for correction of white color at the time of reading an image. The white reference surface 48 is provided, with a prescribed width, at the center in the sub-scanning direction of the light shielding unit 46, as indicated by dot-dashed lines in FIGS. 4 and 7. This white reference surface 48 is used for shading correction.

The image reader 14 also includes an ADF-fed document reading unit 49 which is arranged next to the light shielding unit 46. The ADF 22 feeds a plurality of sheets of documents 28 sequentially to the position where the ADF-fed document reading unit 49 is arranged. Images of the documents 28 thus fed are sequentially read by the carriage 41 at the reading position RP where the ADF-fed document reading unit 49 is arranged.

The image reader 14 includes a positioning mark 51 which is arranged in an area adjacent in the main scanning direction to the area in which the light shielding unit 46 is arranged, at a position falling within the range that can be read by the carriage 41. The positioning mark 51 is arranged on an internal surface of the casing 32 facing the interior thereof, in the area on the front side with respect to the light shielding unit 46. More specifically, in the sub-scanning direction, the positioning mark 51 is arranged in the region where the light shielding unit 46 is disposed, at the center in the sub-scanning direction of the light shielding unit 46. In the main scanning direction, the positioning mark 51 is arranged in front of a front-side line 53 among the lines delimiting the area of the platen 31. In other words, the positioning mark 51 is arranged such that it is located on a side outer than the platen 31 in the main scanning direction of the apparatus, which is in this case the front side in the direction opposite to the direction indicated by the arrow $D_1$. The positioning mark 51 may be in an arbitrary shape. In the present embodiment, the positioning mark 51 is a bold line extending in the main scanning direction. Since the positioning mark 51 is located in the area in the main scanning direction other than the area 44a in which an image of a document 28 placed on the platen 31 is to be read, there is no risk of the image of the positioning mark 51 being erroneously recognized as an image of the document 28. For facilitating understanding, in FIG. 4, the positioning mark 51 provided on the internal surface of the casing 32 is indicated by a solid line, although the mark is actually invisible from the upper side of the platen 31. Further, in FIG. 6, for facilitating understanding, the positioning mark 51 is indicated to have a certain thickness, although actually the positioning mark 51 is not protruding from the internal surface of the casing 32.

The positioning mark 51 defines a position associated with the home position HP of the carriage 41. In the present embodiment, it is configured such that, in the direction in which the carriage 41 moves, i.e. in the sub-scanning direction, the position where the positioning mark 51 is arranged coincides with the position where the home position HP of the carriage 41 is set. The image reader 14 uses this home position HP as a reference position for performing an initialization operation of the carriage 41. More specifically, before the carriage 41 performs a certain operation, for example before it starts reading an image of a document 28 placed on the platen 31 or before it performs shading correction using the white reference surface 48, the initialization operation is performed first to cause the carriage 41 to move to the home position HP as the reference position. Defining this home position HP as the starting point where the operation such as an image reading operation is started ensures that the image reading or other operation can be started with accuracy, even in the case where the carriage 41 stopped at an arbitrary position in the sub-scanning direction as the operation of the image reader 14 had been forcibly terminated.

The image reader 14 includes the control unit 12 which performs control as follows. When the ambient light detecting unit 45 detects the presence of ambient light, the control unit 12 causes the carriage 41 to move, with the exposure lamp 43 turned off, to detect the position of the positioning mark 51. When the ambient light detecting unit 45 detects the absence of ambient light, the control unit 12 causes the carriage 41 to move, with the exposure lamp 43 turned on, to detect the position of the positioning mark 51. This will be described in detail later.

A description will now be made about the case of using the digital multifunctional peripheral 11 shown, for example, in FIG. 1 to cause the carriage 41 to move to the home position HP. Here, the description is given about the case where the digital multifunctional peripheral 11 including the image reader 14 returns from a sleep mode and, as an initialization operation, causes the carriage 41 to move to the home position HP. In this case, it is assumed that, prior to the movement to the home position HP, the carriage 41 is located, in the space 40 under the platen 31, at an end in the sub-scanning direction of the platen 31 on the side opposite to the side where the light shielding unit 46 is located. In this case, the carriage 41 is supposed to move in the direction indicated by the arrow $D_2$. In the present embodiment, it is assumed that the document pressure plate 34 is open. That is, it is assumed that the above-described document pressure plate position detecting unit constantly detects that the document pressure plate 34 is open.

Figure 8:
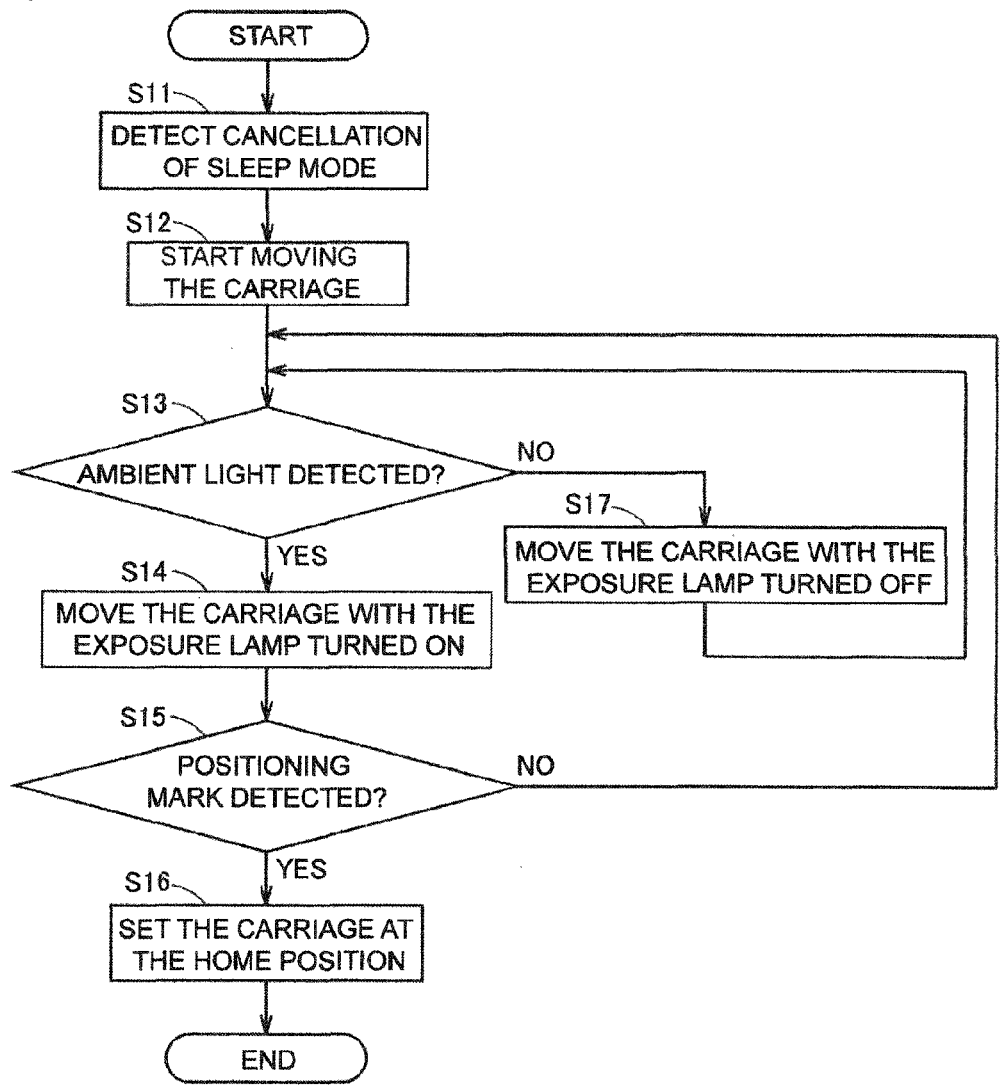
FIG. 8 is a flowchart illustrating a process flow in the case where the digital multifunctional peripheral returns from a sleep mode.
Figure 9:
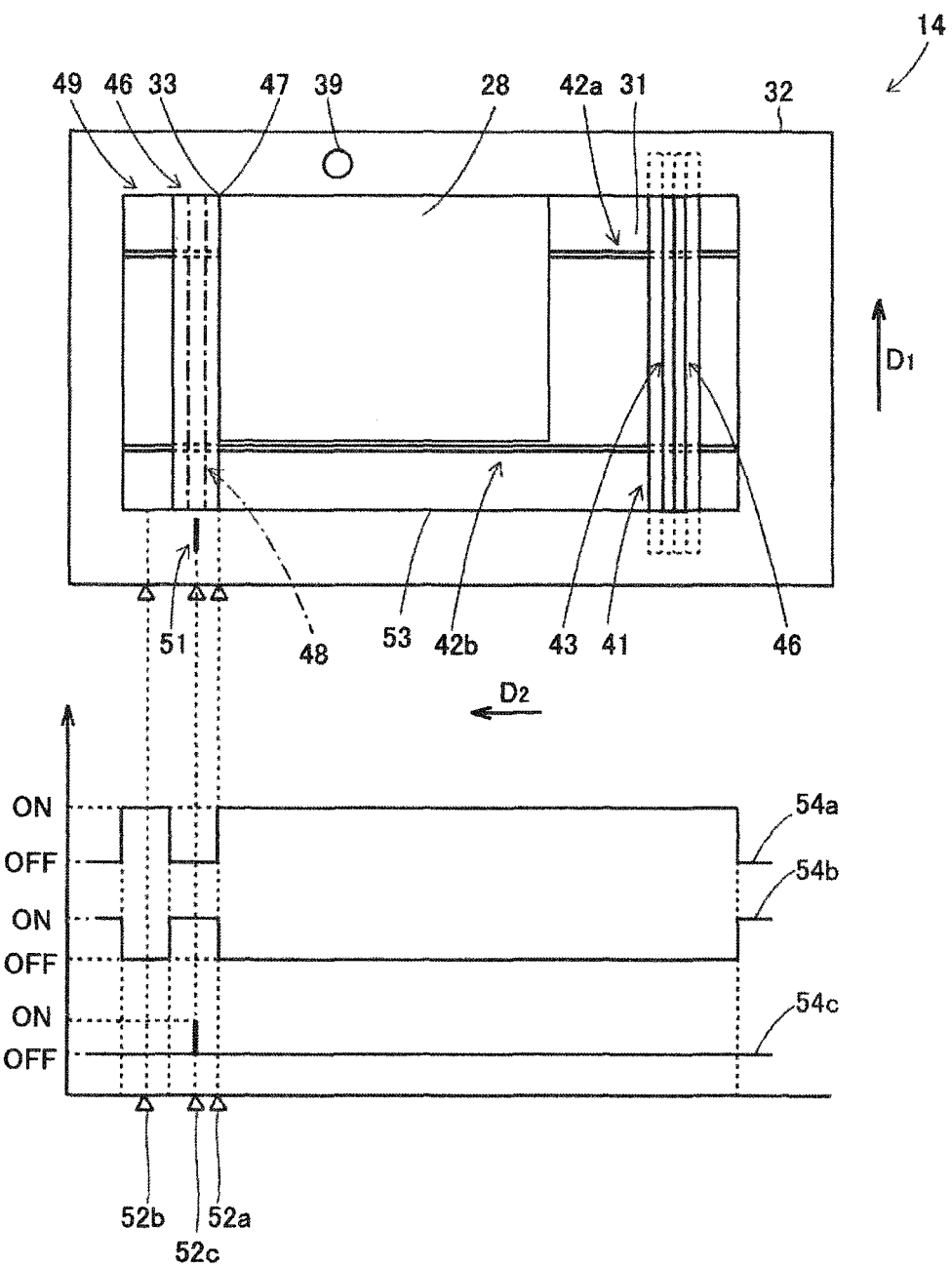
FIG. 9 shows, in its upper part, the image reader with a document placed on the platen, and in its lower part, graphs indicating the state detected by an ambient light detecting unit, the on/off state of an exposure lamp, and the detected state of a positioning mark, in the state where in any position in the sub-scanning direction of the platen, there is an area in the main scanning direction of the platen uncovered by the document.

FIG. 8 is a flowchart illustrating a process flow in the case where the digital multifunctional peripheral 11 returns from a sleep mode. FIG. 9 shows, in its upper part, the image reader 14 with a document 28 placed on the platen 31 as in FIG. 7, and in its lower part, graphs indicating the state detected by the ambient light detecting unit 45, the on/off state of the exposure lamp 43, and the detected state of the positioning mark 51. Here, the graphs in the lower part of FIG. 9 will be described briefly. A line 54a indicates the state detected by the ambient light detecting unit 45, a line 54b indicates the on/off state of the exposure lamp 43, and a line 54c indicates the detected state of the positioning mark 51. Of the line 54a, the "ON" state means that the ambient light detecting unit 45 is detecting the presence of ambient light, while the "OFF" state means that the ambient light detecting unit 45 is detecting the absence of ambient light. Of the line 54b, the "ON" state means that the exposure lamp 43 is on, while the "OFF" state means that the exposure lamp 43 is off. Of the line 54c, the "ON" state means that the positioning mark 51 is detected, while the "OFF" state means that the positioning mark 51 is not detected. For facilitating understanding, in FIG. 9, the diagram identical to FIG. 7 in the upper part and the graphs in the lower part are connected by dotted lines at the position 52a, the reading position RP, and the home position HP in the sub-scanning direction. In the present embodiment, the ambient light detecting unit 45 and the exposure lamp 43 are arranged adjacent to each other, so their positions in the sub-scanning direction are not the same. However, the timing when the ambient light detecting unit 45 detects the presence or absence of ambient light and the timing when the exposure lam 43 is turned off or on are almost the same. Therefore, for facilitating understanding, the graphs show their ON and OFF at the same timing Referring to FIGS. 1 to 9, assume that, in the image reader 14 included in the digital multifunctional peripheral 11, it has been detected that the document pressure plate 34 was opened. Then, the digital multifunctional peripheral 11 cancels the sleep mode (in FIG. 8, step S11; hereinafter, "step" will be omitted), and starts a return operation from the sleep mode. Then, the image reader 14 operates to move the carriage 41 to the home position HP as an initialization operation. In this case, the carriage 41 is caused to detect the position of the positioning mark 51, arranged in the same position as the home position HP in the sub-scanning direction, and move to the position where the positioning mark 51 was detected. Specifically, the image reader 14 starts moving the carriage 41 from the position where the carriage 41 was located at the time when the apparatus returned from the sleep mode (S12). The carriage 41 is caused to start moving in the direction indicated by the arrow $D_2$ in FIG. 7.

In the process of moving the carriage 41, the ambient light detecting unit 45 detects the presence or absence of ambient light. In this case, the document pressure plate 34 is open, and the platen 31 is not entirely covered by the document 28 in the main scanning direction. Therefore, ambient light constantly enters as long as the carriage 41 is located beneath the platen 31 in the space 40 while moving. Thus, the ambient light detecting unit 45 included in the carriage 41 detects the presence of ambient light (YES in S13). In this case, the state detected by the ambient light detecting unit 45 shown by the line 54a becomes "ON" as the ambient light detecting unit 45 detects the presence of ambient light. With the presence of ambient light, the one/off state of the exposure lamp 43 shown by the line 54b becomes "OFF", i.e. the exposure lamp 43 is turned off. In this state, the carriage 41 keeps on moving in the direction indicated by the arrow $D_2$ (S17).

Thereafter, when the carriage 41 reaches the position beneath the light shielding unit 46 in the space 40, ambient light no longer enters. Then, the ambient light detecting unit 45 detects the absence of ambient light, and the state detected by the ambient light detecting unit 45 shown by the line 54a becomes "OFF" (NO in S13). With the absence of ambient light, the on/off state of the exposure lamp 43 shown by the line 54b becomes "ON", i.e. the exposure lamp 43 is turned on. In this state, the carriage 41 keeps on moving in the direction indicated by the arrow $D_2$ (S14). Thereafter, the carriage 41 reaches the position where the positioning mark 51 is arranged. At this time, the carriage 41 detects the positioning mark 51 (YES in S15). The detected state of the positioning mark 51 shown by the line 54c becomes "ON". In this manner, the position of the positioning mark 51 is detected by the carriage 41.

After the positioning mark 51 is detected, the carriage 41 is set at the detected position, or, at the home position HP (S16). Thereafter, shading correction is carried out as required, or an operation of reading an image of the document 28 is started without the shading correction.

A description will now be made about the case where a rectangular document 28 is placed on the platen 31 in a part in its sub-scanning direction such that the longitudinal direction of the document 28 corresponds to the main scanning direction, so that the entire surface of the platen 31 in the main scanning direction is completely covered by the document 28 in that part in the sub-scanning direction.

Figure 10:
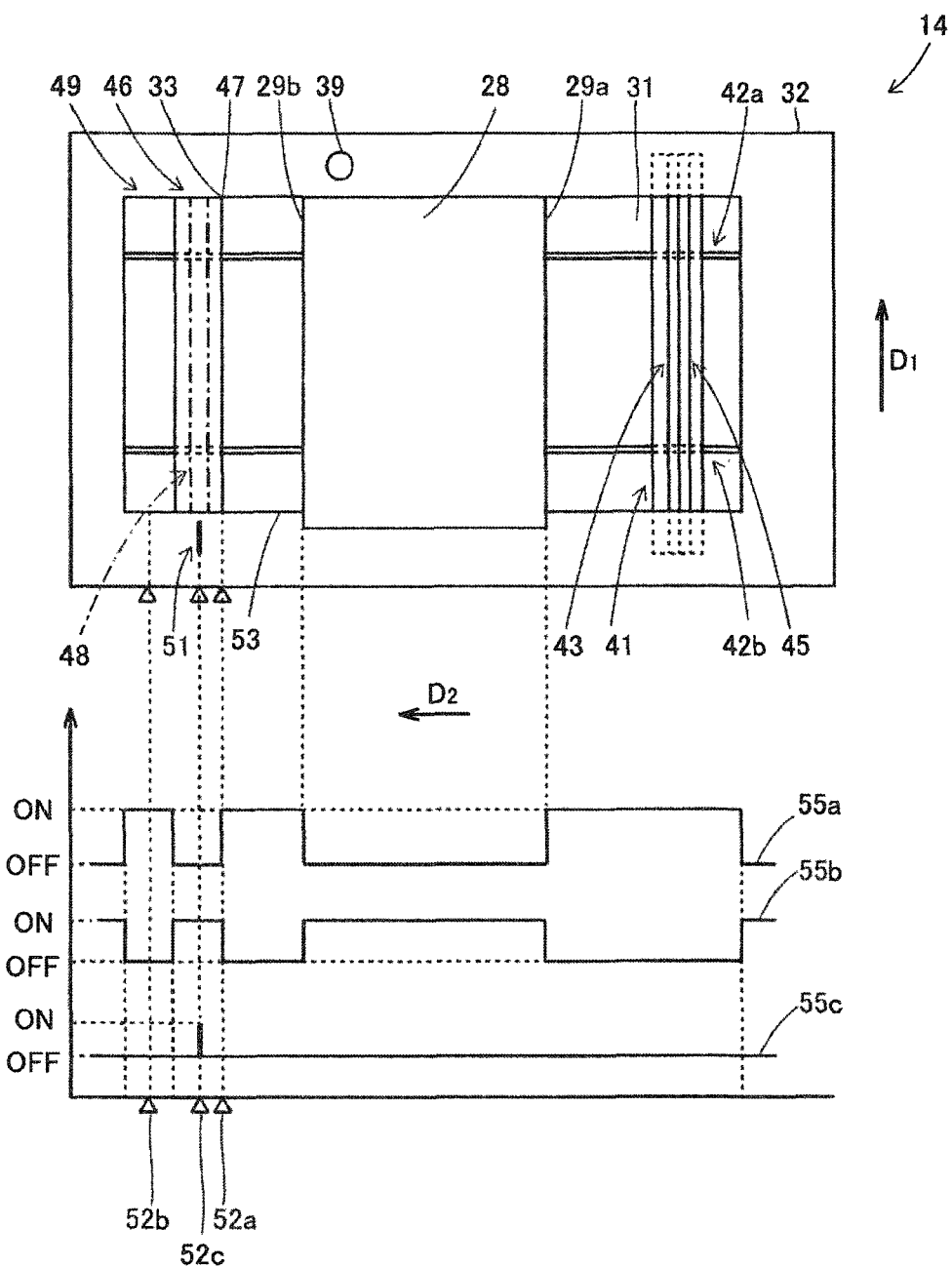
FIG. 10 shows, in its upper part, the image reader with a document placed on the platen, and in its lower part, graphs indicating the state detected by the ambient light detecting unit, the on/off state of the exposure lamp, and the detected state of the positioning mark, in the state where in a part in the sub-scanning direction of the platen, the entire surface in the main scanning direction of the platen is covered by the document.

FIG. 10 shows, in its upper part, the image reader 14 with the document 28 placed on the platen 31 in the above-described manner, and in its lower part, graphs indicating the state detected by the ambient light detecting unit 45, the on/off state of the exposure lamp 43, and the detected state of the positioning mark 51. Referring to FIG. 10 as well, the carriage 41 moves in the direction indicated by the arrow $D_2$ from the same position as described above (S12 in FIG. 8). In this case, the ambient light detecting unit 45 first detects the presence of ambient light (YES in S13), so the state detected by the ambient light detecting unit 45 shown by the line 55a becomes "ON". With the presence of ambient light, the on/off state of the exposure lamp 43 shown by the line 55b becomes "OFF", i.e. the exposure lamp 43 is turned off. In this state, the carriage 41 keeps on moving in the direction indicated by the arrow $D_2$ (S17).

Thereafter, the carriage 41 reaches an end 29a on one side in the sub-scanning direction of the document 28. Then, the ambient light detecting unit 45 detects the absence of ambient light (NO in S13), and the state detected by the ambient light detecting unit 45 shown by the line 55a becomes "OFF". With the absence of ambient light, the on/off state of the exposure lamp 43 shown by the line 55b becomes "ON", i.e. the exposure lamp 43 is turned on. In this state, the carriage 41 keeps on moving in the direction indicated by the arrow $D_2$ (S14). In this case, light is emitted from the exposure lamp 43, so as to look for the positioning mark 51. However, there is no positioning mark 51 in the area in the sub-scanning direction where the document 28 is placed, and therefore, the detected state of the positioning mark 51 shown by the line 55c becomes "OFF" (NO in S15).

As the carriage 41 further moves in the direction indicated by the arrow $D_2$, when the carriage 41 reaches an end 29b on the other side in the sub-scanning direction of the document 28, the ambient light detecting unit 45 detects the presence of ambient light again (YES in S13). The state detected by the ambient light detecting unit 45 shown by the line 55a becomes "ON" again. With the presence of ambient light, the on/off state of the exposure lamp 43 shown by the line 55b becomes "OFF", i.e. the exposure lamp 43 is turned off. In this state, the carriage 41 further moves in the direction indicated by the arrow $D_2$ (S17).

The carriage 41 then reaches the light shielding unit 46. Once the carriage 41 has reached the light shielding unit 46, the ambient light detecting unit 45 detects the absence of ambient light (NO in S13), and the state detected by the ambient light detecting unit 45 shown by the line 55a becomes "OFF" again. With the absence of ambient light, the on/off state of the exposure lamp 43 shown by the line 55b becomes "ON" again, i.e. the exposure lamp 43 is turned on. In this state, the carriage 41 moves in the direction indicated by the arrow $D_2$ (S14). Thereafter, the carriage 41 detects the positioning mark 51 (YES in S15). Here, the detected state of the positioning mark 51 shown by the line 55c becomes "ON". In this manner, the position of the positioning mark 51 is detected by the carriage 41, and the carriage 41 is set at the home position HP (S16).

As such, according to the image reader 14 included in the digital multifunctional peripheral 11 configured as described above, when the ambient light detecting unit 45 detects the presence of ambient light, the carriage 41 is caused to move with the exposure lamp 43 turned off. In this case, the exposure lamp 43 is off, so a user will not be dazzled by the light from the exposure lamp 43. On the other hand, when the ambient light detecting unit 45 detects the absence of ambient light, the carriage 41 is caused to move with the exposure lamp 43 turned on. In this case, the light from the exposure lamp 43 is blocked by the light shielding unit 46, preventing the user from being dazzled by the light from the exposure lamp 43. By emitting light from the exposure lamp 43, the carriage 41 is able to detect the positioning mark 51 which is arranged in the area adjacent in the main scanning direction to the area in which the light shielding unit 46 is arranged, at the position falling within the range that can be read by the carriage 41. The positioning mark 51 is defined as a position associated with the home position HP of the carriage 41, so that the carriage 41 can be moved to the home position HP appropriately. In this case, the position of the positioning mark 51 is detected using the carriage 41 including the exposure lamp 43. This eliminates the need to provide an additional light emitting unit or a PI sensor. According to this image reader 14, it is possible to appropriately place the carriage 41 in the home position, with reduced cost. Further, the digital multifunctional peripheral 11 as described above can appropriately process images.

Further, in this case, the positioning mark 51 is arranged in the area which is adjacent in the main scanning direction to the area in which the light shielding unit 46 is arranged. That is, the positioning mark 51 is arranged in the area where no image of document 28 is read, ensuring more reliable detection of the positioning mark 51.

The ambient light detecting unit 45 is attached to the carriage 41, ensuring more accurate detection of the presence or absence of ambient light.

Further, in this case, the position of the positioning mark 51 in the direction in which the carriage 41 moves, i.e. in the sub-scanning direction, coincides with the position where the home position HP of the carriage 41 is set. This makes it possible to more reliably move the carriage 41 to the home position HP.

Further, in this case, the image reader 14 includes the document pressure plate 34, which is configured to hold a document 28 placed on the platen 31 in place and which can be opened or closed to uncover or cover the upper surface of the platen 31, and the document pressure plate position detecting unit, which detects whether the document pressure plate 34 is open or closed. The ambient light detecting unit 45 detects the presence of ambient light when the document pressure plate position detecting unit detects that the document pressure plate 34 is open. With this result of detection by the document pressure plate position detecting unit indicating the open/closed state of the document pressure plate 34, the presence or absence of ambient light can be detected more reliably.

When the document pressure plate position detecting unit detects that the document pressure plate 34 is closed, it means that no ambient light enters. Therefore, it may be configured to turn on the exposure lamp 43 when it is detected that the document pressure plate 34 is closed.

In the embodiment described above, it has been assumed that, at the start of the initialization operation, the carriage 41 is located at an end in the sub-scanning direction of the platen 31 on the side opposite to the side where the light shielding unit 46 is arranged. The present disclosure however is not limited thereto; it is also applicable, for example, to the case where the initialization operation is started in the state where the carriage is located at the position where the ADF-fed document reading unit or the light shielding unit is arranged, to detect the positioning mark. In this case, the state detected by the ambient light detecting unit 45, the on/off state of the exposure lamp 43, and the detected state of the positioning mark 51 while the carriage is moving in the region beneath the ADF-fed document reading unit and the light shielding unit are output as shown by the graphs in the lower parts in FIGS. 9 and 10.

In the embodiment described above, the positioning mark 51 was provided on the front side of the image reader 14. The position of the positioning mark is not limited thereto; it may be provided on the rear side of the image reader.

Figure 11:
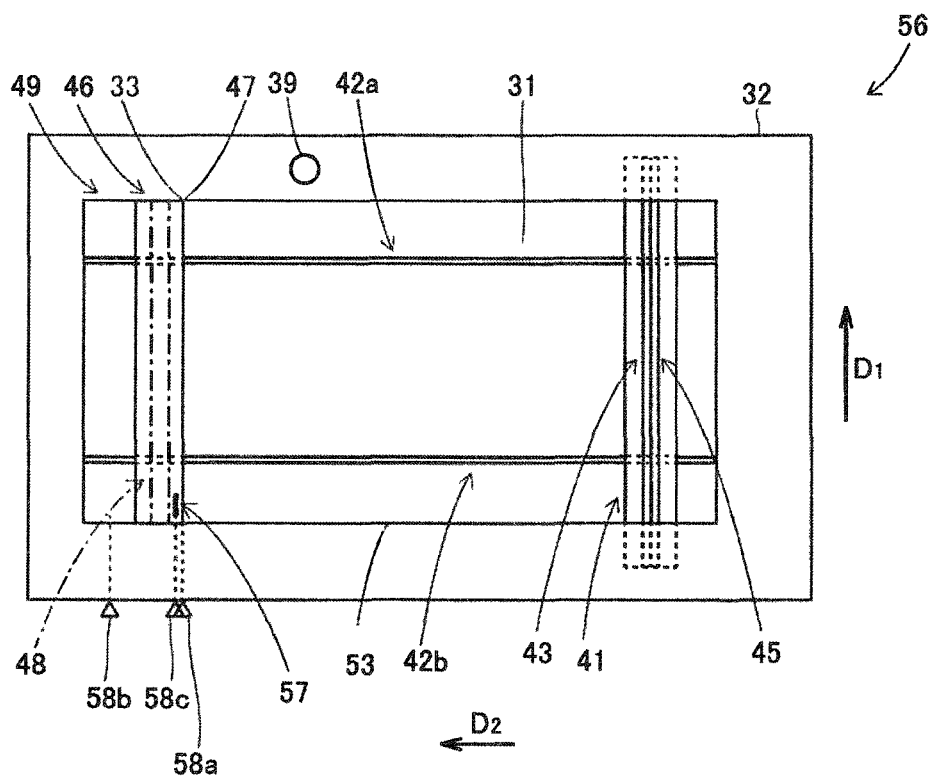
FIG. 11 is a schematic view, as seen from above, of a part of the image reader according to another embodiment of the present disclosure.

Further, it may be configured such that the positioning mark is arranged in the area in which the light shielding unit is arranged, at a position falling within the range that can be read by the carriage. FIG. 11 shows a part of the image reader in such a case. FIG. 11 is a schematic view, as seen from above, of a part of the image reader according to another embodiment of the present disclosure. FIG. 11 corresponds to FIG. 4. In the image reader 56 shown in FIG. 11, the same members as those in the image reader 14 shown in FIG. 4 are denoted by the same reference characters, and the description thereof will not be repeated.

Referring to FIG. 11, the image reader 56 has a positioning mark 57 arranged at a position associated with the home position HP of the carriage 41, which is in this case a position that is identical in the sub-scanning direction to the home position HP of the carriage 41. The specific position 58a in the sub-scanning direction at which the operation of reading a document 28 placed on the platen 31 is started and the reading position RP at which a document is actually read in the position where the ADF-fed document reading unit 49 is arranged are as shown in FIG. 11. The positioning mark 57 is arranged in the area in which the light shielding unit 46 is disposed. In this case, the positioning mark 57 is arranged within the area of the light shielding unit 46, on the front side with respect to the center in the main scanning direction, at a position that is off the position of the white reference surface 48 in the direction opposite to the direction indicated by the arrow $D_2$. The positioning mark may be configured in this manner. With this configuration as well, it is possible to detect the positioning mark 57 by turning on the exposure lamp 43, without making the user feel dazzled.

In the embodiments described above, it was configured such that the position where the positioning mark is provided in the sub-scanning direction coincides with the position where the home position of the carriage is set. The present disclosure, however, is not limited thereto. All that is needed is that the positioning mark defines a position associated with the home position of the carriage. That is, for example, the home position may be defined at a position that is 10 mm off the positioning mark in the direction indicated by the arrow $D_2$.

Further, in the embodiments described above, the exposure lamp and the ambient light detecting unit, both attached to the carriage, are arranged adjacent to each other. Not limited thereto, the exposure lamp and the ambient light detecting unit may be arranged spaced apart from each other in the sub-scanning direction. The positions in the sub-scanning direction of the exposure lamp and the ambient light detecting unit may be changed from each other. Further, the ambient light detecting unit may be configured to detect ambient light by using the image sensor.

It should be understood that the embodiments and examples disclosed herein are illustrative and non-restrictive in every respect. The scope of the present disclosure is defined by the terms of the claims, rather than the description above, and is intended to include any modifications within the scope and meaning equivalent to the terms of the claims.

What is claimed is:

1. An image reader comprising:
   a platen for placing thereon a document whose image is to be read;
   a carriage movable in a sub-scanning direction and including
      an exposure lamp configured to irradiate the document with light and
      an image sensor configured to read the image of the document on the basis of light reflected from the document;
   a light shielding unit arranged adjacent in the sub-scanning direction to the platen and configured to block the light from the exposure lamp from leaking out;
   a positioning mark defining a position associated with a home position of the carriage, the positioning mark being arranged in an area in which the light shielding unit is disposed or in an area adjacent in a main scanning direction to the area in which the light shielding unit is disposed, at a position falling within a range that can be read by the carriage;
   an ambient light detecting unit that detects presence or absence of ambient light incident onto the carriage from above the carriage; and
   a control unit that performs control to cause, when the ambient light detecting unit detects the presence of ambient light, the carriage to move with the exposure lamp turned off to detect a position of the positioning mark, and cause, when the ambient light detecting unit detects the absence of ambient light, the carriage to move with the exposure lamp turned on to detect the position of the positioning mark.

2. The image reader according to claim 1, wherein the ambient light detecting unit detects ambient light using the image sensor.

3. The image reader according to claim 1, wherein the ambient light detecting unit is attached to the carriage.

4. The image reader according to claim 1, wherein the light shielding unit has, on its surface facing a space in which the carriage is located, a white reference surface serving as a reference for correction of white color at the time of reading an image.

5. The image reader according to claim 1, further comprising:
   a document pressure plate configured to hold a document placed on the platen in place, the document pressure plate being able to be opened or closed to uncover or cover an upper surface side of the platen; and
   a document pressure plate position detecting unit that detects whether the document pressure plate is open or closed; wherein
   the ambient light detecting unit detects the presence of ambient light when the document pressure plate position detecting unit detects that the document pressure plate is open.

6. The image reader according to claim 5, wherein the control unit performs control to cause, when the document pressure plate position detecting unit detects that the document pressure plate is closed, the carriage to move with the exposure lamp turned on to detect the position of the positioning mark.

7. The image reader according to claim 1, wherein the position in which the positioning mark is set and the position in which the home position of the carriage is set are the same in a direction in which the carriage moves.

8. The image reader according to claim 1, wherein the positioning mark is arranged in the area in which the light shielding unit is disposed.

9. The image reader according to claim 1, wherein the positioning mark is arranged in the area adjacent in the main scanning direction to the area in which the light shielding unit is disposed.

10. An image processing apparatus including an image reader which reads an image, the image reader comprising:
    a platen for placing thereon a document whose image is to be read;
    a carriage movable in a sub-scanning direction and including
       an exposure lamp configured to irradiate the document with light and
       an image sensor configured to read the image of the document on the basis of light reflected from the document;

a light shielding unit arranged adjacent in the sub-scanning direction to the platen and configured to block the light from the exposure lamp from leaking out;

a positioning mark defining a position associated with a home position of the carriage, the positioning mark being arranged in an area in which the light shielding unit is disposed or in an area adjacent in a main scanning direction to the area in which the light shielding unit is disposed, at a position falling within a range that can be read by the carriage;

an ambient light detecting unit that detects presence or absence of ambient light incident onto the carriage from above the carriage; and a control unit that performs control to cause, when the ambient light detecting unit detects the presence of ambient light, the carriage to move with the exposure lamp turned off to detect a position of the positioning mark, and cause, when the ambient light detecting unit detects the absence of ambient light, the carriage to move with the exposure lamp turned on to detect the position of the positioning mark.

* * * * *